United States Patent
Gamm et al.

Patent Number: 6,078,887
Date of Patent: Jun. 20, 2000

[54] SPEECH RECOGNITION SYSTEM FOR NUMERIC CHARACTERS

[75] Inventors: Stephan Gamm, Mönchengladbach; Nils Lenke; Jörg Ockel, both of Aachen, all of Germany

[73] Assignee: U.S. Philips Corporation, New York, N.Y.

[21] Appl. No.: 09/038,564

[22] Filed: Mar. 11, 1998

[30] Foreign Application Priority Data

Mar. 11, 1997 [DE] Germany .............. 197 09 990

[51] Int. Cl.$^7$ .................................. G10L 15/22
[52] U.S. Cl. .............................................. 704/275
[58] Field of Search ................... 704/235, 275

[56] References Cited

U.S. PATENT DOCUMENTS

| | | | |
|---|---|---|---|
| 5,357,596 | 10/1994 | Takebayashi et al. | 704/275 |
| 5,712,957 | 1/1998 | Waibel et al. | 704/240 |
| 5,855,000 | 12/1998 | Waibel et al. | 704/235 |

FOREIGN PATENT DOCUMENTS

WO9506309  3/1995  WIPO .............. G10K 11/00

OTHER PUBLICATIONS

Hermann Ney et al: "Progress in Large Vocabulary, Continuous Speech Recognition", in H. Niemann, R. Demori, G. Hanrieder: Progress and Prospects of Speech Research and Technology, 1994, pp. 75–92.

*Primary Examiner*—David R. Hudspeth
*Assistant Examiner*—Tālivaldis Ivars Šmits
*Attorney, Agent, or Firm*—Daniel J. Piotrowski

[57] ABSTRACT

The invention relates to a speech recognition system for numeric characters, comprising a control device (33) for recognizing at least one numeric character sequence and for producing the recognized numeric characters of at least one numeric character sequence. For correcting erroneously recognized numeric characters there is proposed that the control device (33) is used for comparing a spoken second numeric character sequence with the first numeric character sequence in the case of at least one erroneously recognized numeric character of a first numeric character sequence. The control device (33) is then used for determining correlating numeric characters of a part of the first numeric character sequence, which sequence has the most matches with the numeric characters of the second numeric character sequence when the number of numeric characters of the second numeric character sequence is smaller than the number of numeric characters of the first numeric character sequence. The control device (33) then substitutes the non-matching numeric characters of the second numeric character sequence for the numeric characters of the determined part of the first numeric character sequence. If, however, the second spoken numeric character sequence is not shorter than the first, it is used to replace the entire first spoken numeric character sequence.

6 Claims, 3 Drawing Sheets

SPEECH RECOGNITION SYSTEM FOR NUMERIC CHARACTERS

FIELD OF THE INVENTION

The invention relates to a speech recognition system for numeric characters, comprising a control device for recognizing at least one numeric character sequence and for producing the recognized numeric characters of at least one numeric character sequence.

BACKGROUND OF THE INVENTION

Such a system is known, for example, from WO 95/06309 A1 and includes a remote control with a microphone and a circuit for forming a modulated infrared signal. A user's speech entries captured by the microphone are transmitted via an infrared signal to a control device that converts the speech entries into code words and are transmitted to an evaluation circuit for forming control commands, for example, for a video cassette recorder or television set. Certain functions can be executed in the television set or video cassette recorder by individual speech entries or speech commands. For example, a channel may be selected, the sound level may be set or the playback of a video tape may be stopped. A description is also given of a time programming for the video cassette recorder in which a programming is made in a fixedly predefined sequential order in that channel, date, starting and end time are entered. When speech is entered, the entry of numeric characters is necessary. After numeric characters have been entered, for example, for a channel or a time of day, they are made into responses for providing a respective control of the video cassette recorder or television set. A comparison is then made with stored patterns. If a numeric character has been wrongly recognized and assigned to a wrong pattern, there will be a faulty control.

BRIEF SUMMARY OF THE INVENTION

Therefore, it is an object of the invention to provide a speech recognition system in which a transfer of non-correctly recognized numeric characters is avoided.

The object is achieved by a system of the type defined in the opening paragraph in that, when there is at least one erroneously recognized numeric character of a first numeric character sequence, the control device is provided for comparing a spoken second numeric character sequence with the first numeric character sequence, in that the control device is provided for determining correlating numeric characters of a part of the first numeric character sequence which sequence has the most matches with the numeric characters of the second numeric character sequence when the number of numeric characters of the second numeric character sequence is smaller than the number of numeric characters of the first numeric character sequence, and in that the control device is provided for substituting the non-matching numeric characters of the second numeric character sequence for the numeric characters of the determined part of the first numeric character sequence.

In the system according to the invention, a verification of the speech entries is made by the user. A selective correction is made of those numeric characters that have not been recognized. The speech recognition may be taken from the method known from the publication "Hermann Ney, Volker Steinbiss, Xavier Aubert, Reinhold Haeb-Umbach: Progress in Large Vocabulary, Continuous Speech Recognition, in: H. Niemann, R. de Mori, G. Hanrieder: Progress and Prospects of Speech Research and Technology, 1994, pp. 75 to 92". According to this method, linked chains of numeric characters are recognized with the aid of Hidden-Markov models. After an entered chain of numeric characters has been produced for the purpose of verification, the user is enabled to accept or refuse the recognized numeric character sequence and subsequently enter certain numeric characters once again. The numeric characters are produced by the control device either via speech synthesis or by producing previously entered and stored single numeric characters. The control device is to understand the numeric characters 0 to 9 and certain control entries such as, for example, "yes", "no" etc.

When a first numeric character sequence has been recognized, the user is asked whether this sequence has been understood correctly. If this is not the case, the user is requested to give another speech entry. He may then enter a completely new numeric character sequence or only a partial numeric character sequence. Subsequently, the first numeric character sequence and the newly entered second numeric character sequence are compared. The control device then determines a part of the first numeric character sequence that has the most numeric character matches with the numeric characters of the second numeric character sequence. It is then presupposed that the number of numeric characters of the second numeric character sequence is smaller than the number of the first numeric character sequence. Subsequently, the non-matching numeric characters of the second numeric character sequence are substituted for the numeric characters of the part of the first numeric character sequence.

Such a system may form, for example, a telephone section in which the telephone number is formed via speech entry. Furthermore, the system according to the invention may be used in an enhanced service (for example, language selection in the network).

The system according to the invention has the advantage that the user enters such numeric characters with the respective context only in the case of a correction. For example, the user pronounces only the numeric characters before and after a numeric character that has been wrongly understood. This form of correction corresponds to the natural behaviour the user is accustomed to and is also faster than entering the whole sequence of numeric characters once again. In addition, this type of correction has a greater chance of success, because the danger of recognition errors is smaller with the entry of a partial numeric character sequence.

During the evaluation process, the control device determines the number of numeric characters of the first and the second numeric character sequence and determines which numeric characters of all the correlating parts of the first numeric character sequence match the numeric characters of the second numeric character sequence. If various parts or sub-sequences respectively, of the first numeric character sequence have the same number of matches, one sub-sequence thereof is selected for the correction. The first sub-sequence from a plurality of sub-sequences having a matching number of numeric characters with a second sub-sequence may be selected.

Furthermore, the control device is used for marking at least a substituted numeric character in the first sub-sequence with a numeric character of the second sub-sequence and for producing a marked numeric character with a sound. Also the other numeric characters are pronounced with a certain stress. The control device indicates numeric characters having an odd position in the numeric character sequence with a rising stress and numeric characters having an even position and having the last position in the numeric character sequence with a falling stress. This form of natural production with pairwise prosody makes an improved recording of the numeric characters possible. The production of a corrected numeric character with emphasis (contrasting stress) makes a simpler successful verification possible.

By producing a corrected first numeric character sequence after the evaluation of a first and a second numeric character sequence, the control device forms a question to the user whether the numeric character sequence has been recognized correctly.

The invention also relates to a speech recognition method of numeric characters in which at least one numeric character sequence is recognized and the recognized numeric characters of at least one numeric character sequence are produced. There is then provided that, in the event of at least one erroneously recognized numeric character of a first numeric character sequence, a spoken second numeric character sequence is compared with the first numeric character sequence, correlating numeric characters of a part of the first numeric character sequence which sequence has the most matches with the numeric characters of the second numeric character sequence are determined when the number of numeric characters of the second numeric character sequence is smaller than the number of the first numeric character sequence, and that the non-matching numeric characters of the second numeric character sequence are substituted for the numeric characters of the determined part of the first numeric character sequence.

These and other aspects of the invention will be apparent from and elucidated with reference to the embodiments described hereinafter.

DETAILED DESCRIPTION OF THE INVENTION

Figure 1:
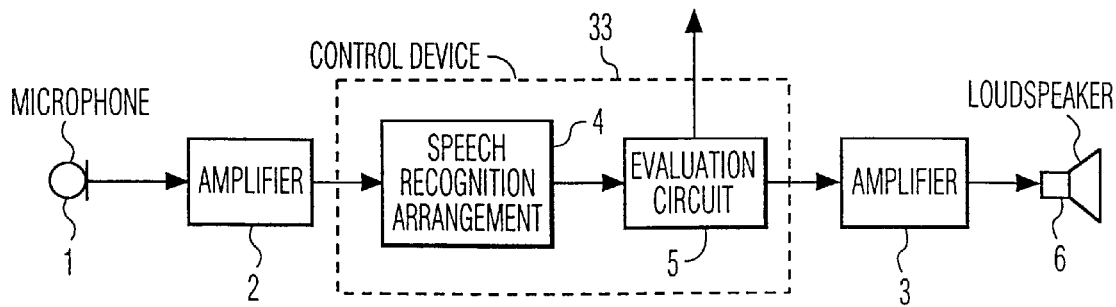
FIG. 1 shows a speech recognition system.

FIG. 1 shows an exemplary embodiment of a speech recognition system for numeric characters, which comprises a microphone 1, two amplifiers 2 and 3, a speech recognition arrangement 4, an evaluation circuit 5 and a loudspeaker 6. The speech recognition arrangement 4 and the evaluation circuit 5 form a control device 33. Speech inputs of a user are fed to the microphone 1. The system includes special speech entries, that is, certain numeric character sequences (for example, "3 8 7 4 2 1 6") and control entries which are fed to the speech recognition arrangement 4 via the amplifier 2. The speech recognition arrangement 4 may comprise, for example, a signal processor with appropriate peripherals, the running program of which signal processor makes speech recognition possible. Such programs are known and the methods on which the program is based may be taken from, for example, the document "Hermann Ney, Volker Steinbiss, Xavier Aubert, Reinhold Haeb-Umbach: Progress in Large Vocabulary, Continuous Speech Recognition, in: H. Niemann, R. de Mori, G. Hanrieder: Progress and Prospects of Speech Research and Technology, 1994, pp. 75 to 92". The numeric character sequences entered by the user and recognized are applied to the evaluation circuit 5 as code words (for example, in the ASCII code). The evaluation circuit 5 includes a voice response unit which forms voice responses from the recognized numeric characters. The voice response unit may then be either a speech synthesizer which applies the synthesized numeric characters to the amplifier 3, or the voice response unit extracts a speaker's stored speech segments from a memory, which speech segments are also applied to the amplifier 3.

The voice responses are then announced to the user via the loudspeaker 6 to test them. The evaluation circuit further also produces certain announcements or phrases respectively such as, for example, "Has the numeric character sequence been understood correctly?". The user may then carry out corrections in the event of an erroneously understood numeric character or numeric character sequence.

Figure 2:
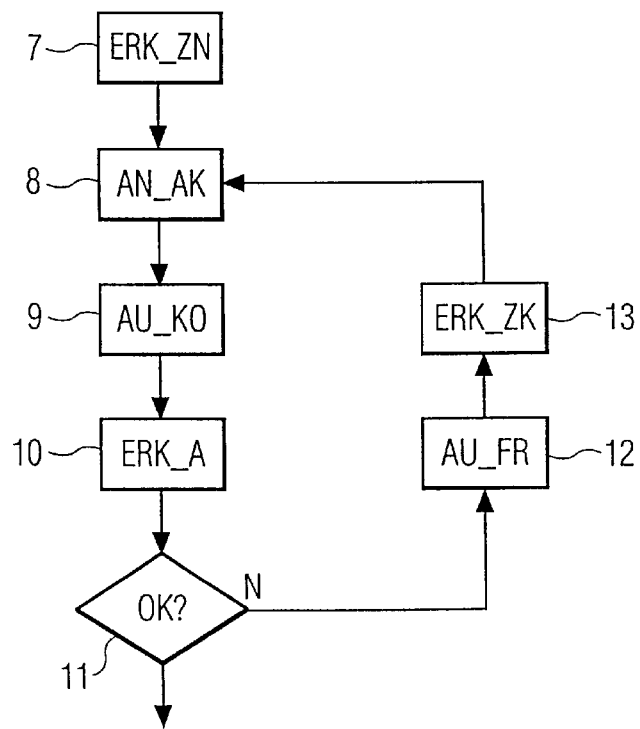
FIGS. 2 to 4 show flow charts in explanation of the speech recognition method.

The evaluation circuit 5 further includes a microprocessor with appropriate peripherals, which microprocessor comprises a software module for processing the recognized control entries and numeric characters and for controlling the voice response unit. FIG. 2 diagrammatically shows the flow chart of the main process for recognizing numeric characters. After a numeric character sequence has been received by the speech recognition arrangement 4, which is denoted by the abbreviation ERK_ZN in a block 7 of FIG. 2, an analysis and accent marking (AN_AK, block 8) is carried out for the voice response unit. Numeric characters having an odd position in a numeric character sequence are marked with a "b" and numeric characters having an even position in the numeric character sequence are marked with an "e". The last numeric character of the numeric character sequence is marked with an "e", irrespective of whether it has an even or an odd position in the numeric character sequence. This means that the numeric characters on the first, third, fifth position and so on of the numeric character sequence are featured by a "b" and the numeric characters on the second, fourth, sixth position and so on of the numeric character sequence are featured by an "e". A pairwise prosody is then produced for the response. For example, the numeric character sequence "3 8 7 4 2 1 6" is marked as follows: "3b 8e 7b 4e 2e 1b 6e".

In the flow chart shown in FIG. 2, the next step after block 8 is denoted by a block 9 (AU_KO). This block features the response of the recognized numeric character sequence and the question whether the numeric character sequence has been recognized correctly. When the numeric character sequence is responded, the voice response unit of the evaluation circuit 5 uses two phrase variants. A numeric character is produced either with rising or falling stress. For the numeric characters marked "b", phrases are used with rising stress and for the numeric characters marked "e", phrases are used with falling stress. As a result, there is a pairwise prosody pattern in the voice response unit which pattern corresponds to the natural speech behaviour of human beings.

Once the user's reply to the question of the system has been recognized (block 10, ERK_A), there is tested in a query block 11 (OK?) what the reply is. If the user has replied with "Yes", the numeric character sequence is recognized and the entry is terminated. The recognized numeric character sequence may then be used to be processed further. If the reply is "No", the system asks the user for a correction, which is represented by the abbreviation AU_FR in a block 12. The user may then enter a completely new numeric character sequence or a numeric character sub-sequence. The ensuing speech recognition process and the analysis of the newly entered numeric character sequence is denoted in a block 13 by the abbreviation ERK_ZK. After the speech recognition and speech analysis in block 13, the further analysis and stress marking as described above is carried out (block 8).

Figure 3:
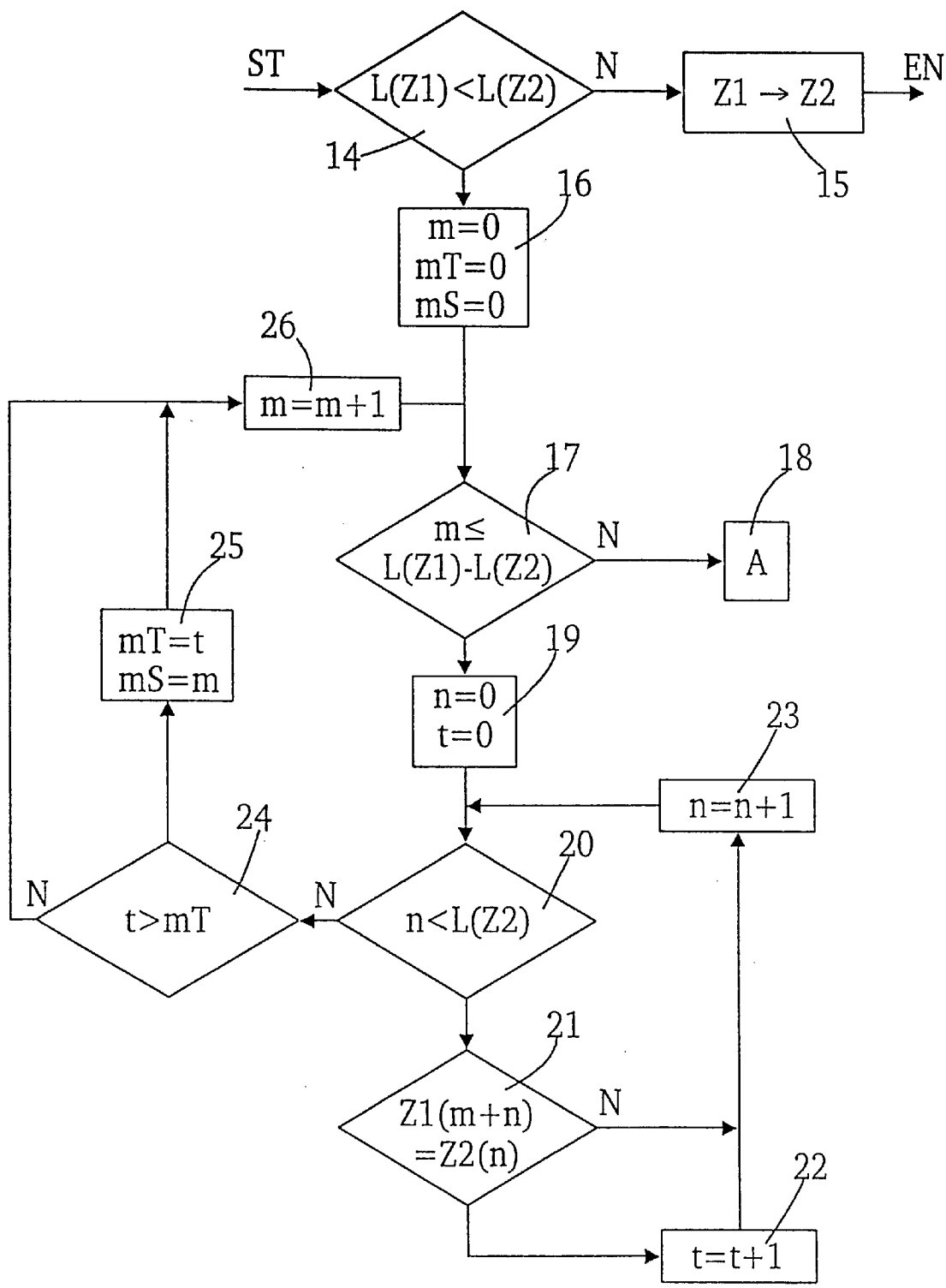
Figure 4:
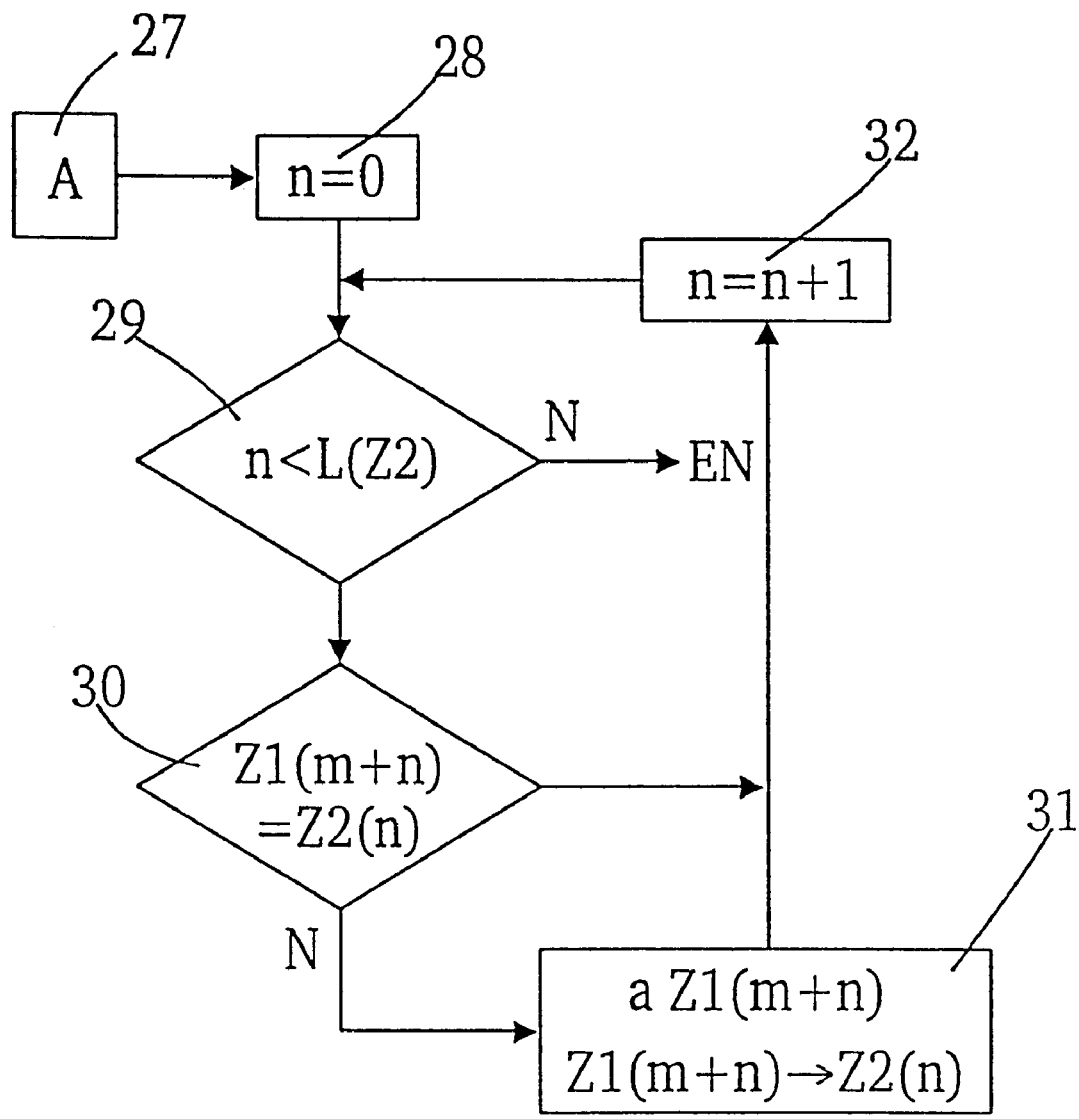

The analysis indicated by block 13 is further explained with the aid of the flow charts in FIGS. 3 and 4. The beginning of the analysis in FIG. 3 is featured as ST. First the test is made whether the length L(Z1) of the previous numeric character sequence Z1 is smaller than the length L(Z2) of the new numeric character sequence Z2 (block 14: L(Z1)<L(Z2)). If this is not the case, the new numeric character sequence Z2 is substituted for the previous numeric character sequence Z1, which is indicated in a block 15 by Z1→Z2. This terminates the analysis (EN). However, if the numeric character sequence Z1 is larger than or equal to the new numeric character sequence Z2, the variables m, mT and mS are set to zero (m=0, mT=0, mS=0) as is shown in a block 16.

Now the part of the flow chart will be described which finds out which part of the previous numeric character sequence Z1 resembles the new numeric character sequence Z2 the most. At the beginning of a first loop a test is made (block 17) whether the numeric character sequence Z2 has been compared with each part of the numeric character sequence of Z1. In block 17 a test is made whether the value of the variable m is smaller than or equal to the difference of the lengths of the numeric character sequences of Z1 and Z2: m≦L(Z1)–L(Z2). If, for example, the numeric character sequence Z1 has the numeric characters "3 8 7 4 2 1 6" and the numeric character sequence Z2 the numeric characters "752", the length of the numeric character sequence Z1 will be equal to 7 and the length of the numeric character sequence Z2 equal to 3. Thus, the first loop is to be passed through five times in all, because five parts of the numeric character sequence Z1 ("387", "874", "742", "421" and "216") are compared with the numeric character sequence Z2. If the comparison in block 17 shows that the value of the variables m is greater than the difference of the length of the numeric character sequences Z1 and Z2, the first loop has been terminated and a second loop is changed to whose flow chart is shown in FIG. 4. The transition to the second loop is shown by the mark "A" (block 18).

If the comparison m≦L(Z1)–L(Z2) is true, two further variables n and t are set to zero as is shown in a block 19. The variable n indicates the position of a numeric character in the numeric character sequence Z2 and the variable t the number of numeric character matches between the part to be compared of the numeric character sequence Z1 and of the numeric character sequence Z2. The next query block 20 is part of a sub-loop, as are the blocks 21, 22 and 23. In block 20 there is verified whether the value of the variables n is smaller than the length of the numeric character sequence Z2. If this is the case, query block 21 queries whether the numeric character on the position m+n of the numeric character sequence Z1 is equal to the numeric character on the position n of the numeric character sequence Z2 (Z1(m+n)=Z2(n)). If this query is answered positively, the variable t is incremented (block 22). If answered negatively, a jump is made to block 23 as is done when block 22 has been processed. The block 23 indicates the incrementation of the variable n. Subsequently, the processing is carried on in block 20.

If the case occurs that the value of the variable n is greater than or equal to the length of the numeric character sequence Z2 (block 20), the processing is carried on with a query block 24. Here a test is made whether the value of the variable t is greater than the value of the variable mT. If this is the case, the variable mT is set equal to t and the variable mS equal to m (block 25). The variable mS indicates the part of the numeric character sequence Z1 which part has the most numeric character matches with the numeric character sequence Z2. The variable mT contains the number of matches. In the next step, after a negative result of the query of block 24, or after the variable mT and mS have been set in block 25, the variable m is incremented as is shown in block 26. This terminates the first loop which determines a part of the numeric character sequence Z2 that corresponds the most with the numeric character sequences Z2. In the example defined above, the part with the numeric characters "742" in the numeric character sequence Z1 having the numeric characters "3 8 7 4 2 1 6" corresponds the most to the numeric character sequence Z2 having the numeric characters "752".

The second loop, shown in the flow chart of FIG. 4, marks the numeric characters of the part of the numeric character sequence Z1 that differ from the numeric characters of the numeric character sequence Z2. The flow chart shown in FIG. 4 starts with a mark "A" in block 27. Before the beginning of the second loop, the variable n is set to zero, which is shown in block 28. This variable n features the position of a numeric character in the numeric character sequence Z2. The second loop comprises query blocks 29 and 30 and further blocks 31 and 32. In the query block 29 is queried whether the value of the variable n is smaller than the length of the numeric character sequence Z2 (n<L(Z2)). If this is not the case, the analysis is terminated. Otherwise, a test is made whether a numeric character of the part of the numeric character sequence Z1 is equal to the assigned numeric character of the numeric character sequence Z2 (block 30). The mathematical expression for this is: Z1(m+n)=Z2(n). When the numeric character on position m+n of the numeric character sequence Z1 corresponds to the numeric character on the position n of the numeric character sequence Z2, block 32 is proceeded to. In the other case, if the numeric characters do not correspond, the numeric character on position n of the numeric character sequence Z2 is substituted for the numeric character on the position n+m of the numeric character sequence Z1. This case is denoted in block 31 by the expression: Z1(m+n)→Z2(n). Additionally, the replaced numeric character is referenced "a". This reference is shown in block 31 by the expression aZ1(m+n). In the next step, the variable n is incremented as is shown in block 32. The further processing is then again effected in query block 29.

After the analysis is made in block 13 (FIG. 2), the new numeric character sequence Z1 is supplied to block 8. For example, the new numeric character sequence Z1 having the numeric characters "3 8 7 5 2 1 6" has been formed from the previous numeric character sequence Z1 having the numeric characters "3 8 7 4 2 1 6" and the numeric characters "752" of the numeric character sequence Z2. The numeric character "5" is then substituted for the numeric character "4". Additionally, the block 8 receives from block 13 the marking of the substitute numeric character or numeric characters referenced by the letter "a". In block 8, the numeric characters are marked with the letters "b" and "e" as described above. A corresponding voice response for the marked numeric character sequence is generated in block 9. A numeric character marked "b" is pronounced with rising stress and a numeric character marked "e" is pronounced with falling stress. A numeric character marked with the letter "a" is additionally subjected to an emphasis to indicate the change to the user. For example, the marking of the new numeric character sequence Z1 is as follows: "3b 8e 7b a5e 2b 1e 6e".

The loop shown in the flow chart of FIG. 2 and comprising blocks 8 to 13 is passed through until the user accepts the result.

It should further be observed that the control device 33 may also be arranged as a computer system which performs the functions of the speech recognition unit 4 and the evaluation circuit 5.

What is claimed is:

1. A speech recognition system for numeric characters, comprising:

a control device which recognizes at least one spoken numeric character sequence and produces the recognized numeric characters of the at least one spoken numeric character sequence, characterized in that, when there is at least one erroneously recognized numeric character of a first spoken numeric character sequence, the control device 1) receives a second spoken numeric character sequence, 2) counts the number of characters in each of the first and second numeric sequences, 3) when the second spoken numeric character sequence is smaller than the first spoken numeric character sequence, the control device, compares the second spoken numeric character sequence with the first spoken numeric character sequence and determines correlating numeric characters of a part of the first spoken numeric character sequence with the second spoken numeric sequence, determines which part of the first numeric sequence has a highest number of matches with the numeric characters of the second spoken numeric character sequence, selects a part of the first numeric character sequence having a highest number of matches with the second numeric character sequence, substitutes the non-matching numeric characters of the second spoken numeric character sequence for the numeric characters of the selected part of the first numeric character sequence and when the second spoken numeric character sequence is not smaller than the first spoken numeric character sequence, the control device, substitutes the second spoken numeric character sequence for the first spoken numeric character sequence.

2. The system as claimed in claim 1, characterized in that the control device marks at least a substituted numeric character in the first numeric character sequence by a numeric character of the second numeric character sequence and produces a marked numeric character with a sound.

3. The system as claimed in claim 1, characterized in that when a corrected first numeric character sequence is produced and after the evaluation of a first and a second numeric character sequence, the control device forms a question to the user whether the numeric character sequence has been recognized correctly.

4. The system as claimed in claim 1, characterized in that the control device produces at least the numeric characters on an odd position of the corrected numeric character sequence with rising stress and at least numeric characters on an even and on the last position of the corrected numeric character sequence with falling stress.

5. A speech recognition method for numeric characters in which at least one spoken numeric character sequence is recognized and the recognized numeric characters of at least one spoken numeric character sequence are produced, and there is at least one erroneously recognized numeric character of a first numeric character sequence, comprising the steps of: 1) receiving a second numeric character sequence 2) counting the number of numeric characters in each of the first and second numeric character sequences 3) comparing a spoken second numeric character sequence with the first numeric character sequence, 4) when the second spoken numeric character sequence is smaller than the first spoken numeric character sequence.

correlating numeric characters of a part of the first spoken numeric character sequence with a second spoken numeric character sequence, determining which part of the first numeric sequence has a highest number of matches with the numeric characters of the second spoken numeric character sequence, selecting a part of the first numeric character sequence having a highest number of matches with the second numeric character sequence, substituting the non-matching numeric characters of the second spoken numeric character sequence for the numeric characters of the selected part of the first numeric character sequence and when the second spoken numeric character sequence is not smaller than the first spoken numeric character sequence, substituting the second spoken numeric character sequence for the first spoken numeric character sequence.

6. A speech recognition system for numeric characters, comprising:

a control device which recognizes at least one spoken numeric character sequence and produces the recognized numeric characters of the at least one spoken numeric character sequence, characterized in that, when there is at least one erroneously recognized numeric character of a first spoken numeric character sequence, the control device 1) receives a second smaller spoken numeric character sequence, 2) counts the number of characters in each of the first and second numeric sequences, 3) compares the second smaller spoken numeric character sequence with the first spoken numeric character sequence and determines correlating numeric characters of a part of the first spoken numeric character sequence with the second spoken numeric sequence, 4) determines which part of the first numeric sequence has a highest number of matches with the numeric characters of the second spoken numeric character sequence, 5) selects a part of the first numeric character sequence having a highest number of matches with the second numeric character sequence, 6) substitutes the non-matching numeric characters of the second spoken numeric character sequence for the numeric characters of the selected part of the first numeric character sequence, 7) marks at least the numeric characters on an odd position of the corrected first spoken numeric character sequence with rising stress, 8) marks at least the numeric characters on an even and on a last position of the corrected first spoken numeric character sequence with falling stress, and 9) produces a marked character with a sound.

* * * * *